United States Patent
O'Shea (10) Patent No.: US 12,061,982 B2
(45) Date of Patent: *Aug. 13, 2024

(54) LEARNING RADIO SIGNALS USING RADIO SIGNAL TRANSFORMERS

(71) Applicant: Virginia Tech Intellectual Properties, Inc., Blacksburg, VA (US)

(72) Inventor: Timothy James O'Shea, Arlington, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,007

(22) Filed: Oct. 7, 2022

(65) Prior Publication Data

US 2023/0136529 A1 May 4, 2023

Related U.S. Application Data

(63) Continuation of application No. 16/416,921, filed on May 20, 2019, now Pat. No. 11,468,317, which is a (Continued)

(51) Int. Cl.
*G06N 3/08* (2023.01)
*G06N 3/04* (2023.01)
(Continued)

(52) U.S. Cl.
CPC .............. *G06N 3/08* (2013.01); *G06N 3/045* (2023.01); *H04B 1/0003* (2013.01); *H04B 17/309* (2015.01)

(58) Field of Classification Search
CPC ........ G06N 3/0454; G06N 3/08; G06N 20/00; G06N 3/0445; G06N 3/084; G06N 3/0481;
(Continued)

(56) References Cited

U.S. PATENT DOCUMENTS 5,297,232 A    3/1994  Murphy
6,366,236 B1   4/2002  Farmer et al.
(Continued)

FOREIGN PATENT DOCUMENTS

CN    1081298      1/1994
CN    102119513    7/2011
(Continued)

OTHER PUBLICATIONS

Abadi et al., TensorFlow: large-scale machine learning on heterogeneous systems, Software available from tensorflow.org, 2015, (online), available at: http://tensorflow.org/.
(Continued)

*Primary Examiner* — Golam Sorowar
(74) *Attorney, Agent, or Firm* — Fish & Richardson P.C.

(57) ABSTRACT

Methods, systems, and apparatus, including computer programs encoded on a storage medium, for processing radio signals. In once aspect, a system is disclosed that includes a processor and a storage device storing computer code that includes operations. The operations may include obtaining first output data generated by a first neural network based on the first neural network processing a received radio signal, receiving, by a signal transformer, a second set of input data that includes (i) the received radio signal and (ii) the first output data, generating, by the signal transformer, data representing a transformed radio signal by applying one or more transforms to the received radio signal, providing the data representing the transformed radio signal to a second neural network, obtaining second output data generated by the second neural network, and determining based on the second output data a set of information describing the received radio signal.

20 Claims, 5 Drawing Sheets

Related U.S. Application Data continuation of application No. 15/970,510, filed on May 3, 2018, now Pat. No. 10,296,831.

(60) Provisional application No. 62/500,836, filed on May 3, 2017.

(51) Int. Cl.
 *G06N 3/045* (2023.01)
 *H04B 1/00* (2006.01)
 *H04B 17/309* (2015.01)

(58) Field of Classification Search
 CPC ........ G06N 3/006; G06N 3/0472; G06N 3/04; G06N 3/086; G06N 5/022; G06N 3/088; G06N 5/046; G06N 3/02; G06N 3/126; G06N 20/20; G06N 3/049; G06N 20/10; G06N 3/06; G06N 3/063; G06N 5/003; G06N 7/005; G06N 3/008; G06N 3/0675; G06N 5/04; G06N 99/00; H04W 24/08; H04W 16/14; H04W 64/006; H04W 24/10; H04W 4/029; H04W 64/00; H04W 72/0453; H04W 52/0203; H04W 72/0473; H04W 24/04; H04W 16/22; H04W 24/02; H04W 56/0035; H04W 72/044; H04W 4/023; H04W 72/042; H04W 16/10; H04W 28/06; H04W 4/40; H04W 4/44; H04W 72/005; H04W 76/10; H04W 88/08; H04W 12/06; H04W 12/12; H04W 12/122; H04W 12/79; H04W 4/025; H04W 52/0229; H04B 17/309; H04B 17/318; H04B 17/27; H04B 17/23; H04B 17/3911; H04B 17/3912; H04B 1/525; H04B 7/0413; H04B 17/24; H04B 17/20; H04B 17/26; H04B 1/0003; H04B 1/56; H04B 17/373; H04B 7/0626; H04B 1/06; H04B 1/123; H04B 17/30; H04B 7/0452; H04B 1/10; H04B 1/40; H04B 17/336; H04B 17/391; H04B 17/3913; H04L 5/14; H04L 25/03165; H04L 5/1461; H04L 25/0254; H04L 2025/03464; H04L 25/0204; H04L 27/265; H04L 5/0005; H04L 5/143; H04L 25/0252; H04L 25/03006; H04L 27/2647; H04L 1/0045; H04L 25/0202; H04L 25/0328; H04L 27/2628; H04L 27/2651; H04L 41/145; H04L 47/29; H04L 1/0001; H04L 1/0033; H04L 1/0036; H04L 1/08; H04L 27/0008; H04L 27/2618; H04L 41/0645; H04L 41/069
 See application file for complete search history.

(56) References Cited

U.S. PATENT DOCUMENTS

| | | | |
|---|---|---|---|
| 8,494,464 | B1 | 7/2013 | Kadambe |
| 10,296,831 | B2 | 5/2019 | O'Shea |
| 11,188,857 | B1 | 11/2021 | Hill |
| 11,288,573 | B2 | 3/2022 | Wu |
| 11,468,317 | B2 | 10/2022 | O'Shea |
| 2008/0037804 | A1 | 2/2008 | Shmunk |
| 2012/0190380 | A1 | 7/2012 | Dupray |
| 2012/0209900 | A1* | 8/2012 | Sorokine .............. H04L 25/0216 708/309 |
| 2013/0289944 | A1 | 10/2013 | Ayesh et al. |
| 2013/0300608 | A1* | 11/2013 | Margalef .............. G01S 5/0252 342/451 |
| 2014/0222739 | A1 | 8/2014 | Ponulak et al. |
| 2015/0371139 | A1* | 12/2015 | Kamlani .............. H04W 4/023 706/12 |
| 2017/0374572 | A1 | 12/2017 | Kleinbeck |
| 2018/0091336 | A1 | 3/2018 | Mody |
| 2018/0365975 | A1 | 12/2018 | Xu et al. |
| 2019/0340506 | A1 | 11/2019 | O'Shea |
| 2022/0013132 | A1 | 1/2022 | Engel et al. |
| 2022/0050133 | A1 | 2/2022 | Newman et al. |

FOREIGN PATENT DOCUMENTS

| | | |
|---|---|---|
| CN | 103262618 | 8/2013 |
| CN | 103945533 | 7/2014 |
| CN | 104569907 | 4/2015 |
| CN | 104641657 | 5/2015 |
| CN | 104756474 | 7/2015 |
| CN | 104869060 | 8/2015 |
| CN | 105122279 | 12/2015 |
| CN | 105699993 | 6/2016 |
| CN | 105743523 | 7/2016 |
| CN | 105760933 | 7/2016 |
| CN | 105915299 | 8/2016 |
| CN | 106126807 | 11/2016 |
| CN | 106165366 | 11/2016 |
| CN | 106250986 | 12/2016 |
| CN | 106535133 | 3/2017 |
| CN | 106537420 | 3/2017 |
| EP | 2538553 | 12/2012 |
| JP | 2001102962 | 4/2001 |
| WO | WO03005525 | 1/2003 |

OTHER PUBLICATIONS

Bergstra et al., "Theano: a CPU and GPU math expression complier," in Proceeding of the Python for the Scientific Computing Conference (SciPy,), Oral Presentation, Austin, TX, Jun. 2010.
Chollet et al., https://github.com/fchollet/keras, 2015.
Clancy et al., "Applications of machine learning to cognitive radio networks," Wireless Communications, IEEE, 2007, 14(4):47-52.
International Search Report and Written Opinion in Appln. No. PCT/US2018/030923, dated Aug. 8, 2018, 14 pages.
Jaderberg et al., "Spatial transformer networks," CoRR, vol. abs/1602.04105, 2016 (online), available at: http://arxiv.orgags/1602.04105.
Kingma et al., "Adam: a method for stachastic optimization," arXiv preprint arXiv:1412.6980, 2014.
Mnih et al., "Recurrent models of visual attention," in Advances in Neural Information Processing systems, 2014, 2204-2212.
PCT International Preliminary Report on Patentability in International Appln. No. PCT/US2018/030923, dated Nov. 5, 2019, 9 pages.
Srivastava et al., "Dropout: a simple way to prevent neural networks from overfitting," The Journal of Machine Learning Research, 2014, 15(1):1929-1958.

* cited by examiner

| PROVIDE A FIRST SET OF INPUT DATA REPRESENTING A PARTICULAR RADIO FREQUENCY SIGNAL TO A FIRST NEURAL NETWORK TRAINED TO ESTIMATE CHARACTERISTICS OF A RADIO SIGNAL    410 |

↓

| OBTAIN FIRST OUTPUT DATA GENERATED BY THE FIRST NEURAL NETWORK    420 |

↓

| RECEIVE, BY A SIGNAL TRANSFORMER, A SECOND SET OF INPUT DATA THAT INCLUDES (I) THE FIRST SET OF INPUT DATA AND (II) THE FIRST OUTPUT DATA GENERATED BY THE FIRST NEURAL NETWORK    430 |

↓

| GENERATE, BY THE SIGNAL TRANSFORMER AND BASED ON THE SECOND SET OF INPUT DATA, DATA REPRESENTING A TRANSFORMED RADIO SIGNAL    440 |

↓

| PROVIDE THE DATA REPRESENTING THE TRANSFORMED RADIO SIGNAL TO A SECOND NEURAL NETWORK THAT HAS BEEN TRAINED TO GENERATE OUTPUT DATA DESCRIBING THE RADIO SIGNAL    450 |

↓

| OBTAIN SECOND OUTPUT DATA GENERATED BY THE SECOND NEURAL NETWORK    460 |

↓

| DETERMINE A TARGET LOSS THAT IS BASED ON (I) THE SECOND OUTPUT DATA AND (II) TARGET INFORMATION DESCRIBING THE PARTICULAR RADIO    470 |

↓

| ADJUST THE RESPECTIVE PARAMETERS OF THE FIRST NEURAL NETWORK AND THE SECOND NEURAL NETWORK BASED ON THE TARGET LOSS    480 |

```
PROVIDE A FIRST SET OF INPUT DATA REPRESENTING A PARTICULAR
RADIO SIGNAL TO A FIRST NEURAL NETWORK TRAINED TO ESTIMATE
CHARACTERISTICS OF A RADIO FREQUENCY SIGNAL         510
```

↓

```
OBTAIN FIRST OUTPUT DATA GENERATED
BY THE FIRST NEURAL NETWORK                          520
```

↓

```
RECEIVE, BY A SIGNAL TRANSFORMER, A SECOND SET OF INPUT DATA
THAT INCLUDES (I) THE FIRST SET OF INPUT DATA AND (II) THE FIRST OUTPUT
DATA GENERATED BY THE FIRST NEURAL NETWORK           530
```

↓

```
GENERATE, BY THE SIGNAL TRANSFORMER AND BASED
ON THE SECOND SET OF INPUT DATA, DATA REPRESENTING A
TRANSFORMED RADIO SIGNAL                             540
```

↓

```
PROVIDE THE DATA REPRESENTING THE TRANSFORMED RADIO SIGNAL
TO A SECOND NEURAL NETWORK THAT HAS BEEN TRAINED TO GENERATE
OUTPUT DATA DESCRIBING THE RADIO SIGNAL              550
```

↓

```
OBTAIN SECOND OUTPUT DATA GENERATED
BY THE SECOND NEURAL NETWORK                         560
```

FIG. 5

LEARNING RADIO SIGNALS USING RADIO SIGNAL TRANSFORMERS

CROSS-REFERENCE TO RELATED APPLICATIONS

This application is a continuation of U.S. application Ser. No. 16/416,921, filed May 20, 2019, now allowed, which is a continuation of U.S. application Ser. No. 15/970,510 filed May 3, 2018, now U.S. Pat. No. 10,296,831, which claims the benefit of U.S. Provisional Patent Application No. 62/500,836 filed May 3, 2017, and entitled "System and Method for Improving Performance of Learning Based Radio Communications and Sensing Systems with Radio Transformer Networks," each of which is incorporated herein by reference in its entirety.

STATEMENT REGARDING FEDERALLY SPONSORED RESEARCH OR DEVELOPMENT

This invention was made with government support under agreement HR0011-16-1-0002 awarded by U.S. Defense Advanced Research Projects Agency. The government has certain rights in the invention.

BACKGROUND

Machine learning models are becoming more prevalent in radio applications. Such systems couple machine learning techniques with hardware radio components to rapidly convert a sampling of a single radio signal into useful information, such as information bits, human understandable labels, or other types of information.

However, such legacy systems have be configured to process all types of radio signals and radio signal parameters at the time of deployment, relying on human configuration of transforms, and cannot be easily optimized for changing signal or channel parameters.

SUMMARY

According to one innovative aspect of the present disclosure, a method that may be performed by one or more devices is disclosed for training a machine learning system to process one or more radio signals. In one aspect, the method includes actions of providing a first set of input data representing one or more radio signals to a first neural network that is configured to generate output data representing an estimation of one or more characteristics of a radio signal, obtaining first output data generated by the first neural network based on the first neural network processing the first set of input data, receiving, by a signal transformer, a second set of input data that includes (i) the first set of input data and (ii) the first output data generated by the first neural network, generating, by the signal transformer and based on the second set of input data, data representing a transformed radio signal by applying one or more transforms of a set of predetermined transforms to the first set of input data representing the one or more radio signals, providing the data representing the transformed radio signal to a second neural network that is configured to generate output data describing the one or more radio signals based on processing the data representing the transformed radio signal, obtaining second output data generated by the second neural network based on the second neural network processing the data representing the transformed radio signal, determining a target loss that is based on (i) the second output data generated by the second neural network and (ii) target information describing the one or more radio signals, and adjusting the respective parameters of the first neural network and the second neural network based on the target loss.

Other versions include corresponding systems, apparatus, and computer programs to perform the actions of methods, encoded on computer storage devices.

These and other versions may optionally include one or more of the following features. For example, in some implementations, the first set of input data is a digital output of an analog-to-digital converter that has sampled the one or more radio signals into a basis function.

In some implementations, the first output data represents one or more characteristics of the one or more radio signals or its corresponding channel state information include estimates of timing information, center frequency, bandwidth, phase, frequency and rate of arrival, direction of arrival, channel delay response, offset, or bandwidth of the particular radio signal.

Ins some implementations, the set of predetermined transforms includes one or more of an affine transform, oscillator and mixer, filter application, resampling, sub-band tuning, or a convolution with a set of filter taps.

In some implementations, each transform of the set of predetermined transforms is performed in a sequential series.

In some implementations, the second output generated by the second neural network includes one or more of data describing signal labels, modulation type, protocol, wireless standards, equipment type, symbol values, data bits, or data code-words.

In some implementations, the method may further include providing the second output data to another device that is configured to use the second output data to adjust one or more communications systems.

In some implementations, the second output data is interpreted by an application at a receiver in order to infer additional information about one or more emitters, wherein the additional information about the emitters may includes location of an emitter, movement of an emitter, behavior of an emitter, or pattern of life of an emitter.

In some implementations, the first input data is generated through use of one or more learned neural networks or channel simulations prior to being received as an input, and the target loss is used to adjust parameters of one or more prior neural networks or simulations of the prior neural networks in addition to the adjustment of the respective parameters of the first and second neural networks.

In some implementations, the one or more radio signals are synchronized using the combination of the first neural network and the set of transforms to produce a set of canonicalized encoded information representing the one or more received radio signals.

In some implementations, a threshold amount of uncertainty surrounding one or more of a frequency offset, a time offset, or other the channel effects has been eliminated from the second set of input data.

In some implementations, a plurality of radio signal communications, radar, or other signals are represented by the first input data, and the first neural network generates the first output data parameterizing the set of transforms to extract one or more isolated radio signals using one or more operations that include sub-band tuning, mixing with an oscillator, and/or filtering.

According to another innovative aspect of the present disclosure, a system to process one or more radio signals.

The system may include one or more processors and one or more computer readable media storing computer code that, when executed by the one or more processors, is configured to perform a plurality of operations. In one aspect, the operations may include providing a first set of input data representing one or more radio signals to a first neural network that has been trained to generate output data representing an estimation of one or more characteristics of a radio signal, obtaining first output data generated by the first neural network based on the first neural network processing the first set of input data, receiving, by a signal transformer, a second set of input data that includes (i) the first set of input data and (ii) the first output data generated by the first neural network, generating, by the signal transformer and based on the second set of input data, data representing a transformed radio signal by applying one or more transforms of a set of predetermined transforms to the first set of input data representing the one or more radio signals, providing the data representing the transformed radio signal to a second neural network that has been trained to generate output data describing the one or more radio signals based on processing the data representing the transformed radio signal, obtaining second output data generated by the second neural network based on the second neural network processing the data representing the transformed radio signal, and determining based on the second output data a set of information describing one or more radio signals in the first set of input data.

Other versions include corresponding methods and computer programs to perform the actions of the operations described above, encoded on computer storage devices.

According to another innovated aspect of the present disclosure, a device for processing radio signals is disclosed. The device may include one or more processors and one or more computer readable media storing computer code that, when executed by the one or more processors, is configured to perform a plurality of operations. In one aspect, the operations may include providing a first set of input data representing one or more radio signals to a first neural network that has been trained to generate output data representing an estimation of one or more characteristics of a radio signal, obtaining first output data generated by the first neural network based on the first neural network processing the first set of input data, receiving, by a signal transformer, a second set of input data that includes (i) the first set of input data and (ii) the first output data generated by the first neural network, generating, by the signal transformer and based on the second set of input data, data representing a transformed radio signal by applying one or more transforms of a set of predetermined transforms to the first set of input data representing the one or more radio signals, providing the data representing the transformed radio signal to a second neural network that has been trained to generate output data describing the one or more radio signals based on processing the data representing the transformed radio signal, obtaining second output data generated by the second neural network based on the second neural network processing the data representing the transformed radio signal, and determining based on the second output data a set of information describing one or more radio signals in the first set of input data.

Other versions include corresponding methods and computer programs to perform the actions of the operations described above, encoded on computer storage devices.

These and other features of the present disclosure are described in more detail in the accompanying drawings, detailed describes, and the claims.

DETAILED DESCRIPTION

Figure 1:
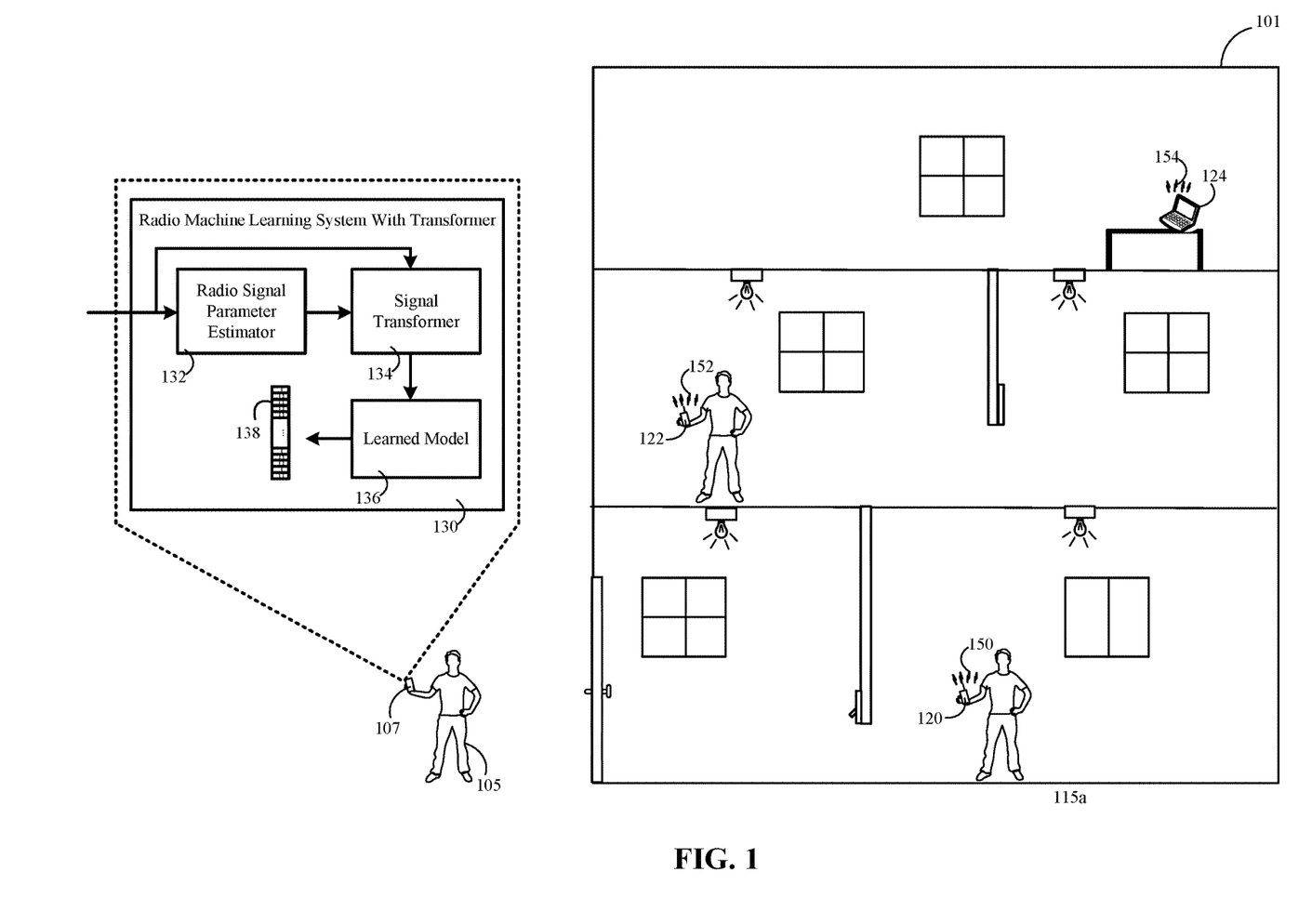
FIG. 1 is a contextual diagram of an example of a radio receiver that uses a machine learning system with a radio transformer to determine a number of wireless transmitters in a building.

FIG. 1 is a contextual diagram of an example of a radio receiver that uses a machine learning system 130 with a radio signal transformer 134 to determine a number of wireless transmitters in a building.

The radio machine learning system 130 includes a radio signal parameter estimator 132, a signal transformer 134, and a learned model 136. The learned model 136 may include a model for regression or classification using a neural network. The radio machine learning system 130 may be deployed within a radio signal receiver 107. Deployment of the radio machine learning system 130 onto the radio signal receiver 107 may include, for example, providing the radio machine learning system 130 to the radio signal receiver 107 across one or more networks as a software download.

By way of example, a user 105 may use the radio signal receiver 107 that includes the radio machine learning system 130 with radio signal transformer 134 to detect radio signals 150, 152, 154 output by one or more radio signal emitters such as devices 120, 122, 124. The radio signal receiver 107 can include a radio signal sensor for detecting one or more radio signals. The radio signal receiver 107 may also include an analog-to-digital converter for generating a digital output that represents on one or more analog radio signal inputs that have been detected by the radio signal sensor. The generated digital output may be generated by sampling one or more particular analog radio signals into a basis function such I/Q representation, OFDM subcarriers, or the like. In some implementations, the analog-to-digital convertor may only digitize a single radio signal. In other implementations, the analog-to-digital convertor may digitize an entire portion of a wireless spectrum such as the 100 MHz spectrum that includes multiple different radio signals.

The output of the analog-to-digital converter can be provided to a radio signal parameter estimator 132. The radio signal parameter estimator 132 may include a neural network that is trained to estimate parameters of the detected radio signals 150, 152, 154. Radio signals shown are emitted from mobile computing devices (e.g. phones, laptops, tablets), but may also include embedded devices, industrial/infrastructure devices, unintended EMI, malicious attackers, vehicular radios, and numerous other electronic devices emitting radio signals. The parameters of the detected radio signals 150, 152, 154 may include any measurable characteristic of a radio signal such as timing information, frequency, center frequency, bandwidth, phase, rate of arrival, direction of arrival, offset, or the like. Alternatively, or in addition, parameters of the detected radio signals 150, 152, 154 may include any measurable characteristic of corresponding channel state information associated with the radio signal such as the channel delay response. The output of the radio signal parameter estimator 132 is a set of estimated radio signal parameters representing the one or more radio signals 150, 152, 154 detected by the radio signal receiver 107.

The output of the radio signal parameter estimator 132 can be provided to the signal transformer 134 along with the original output from the analog-to-digital converter that represents the detected radio signals 150, 152, 154. The signal transformer 134 is configured to apply one or more transforms from a set of transforms to the detected radio signals 150, 152, 154. The set of one or more transforms may include, for example, an affine transform, an oscillator and mixer/multiplier, a convolution with a parametric set of filter taps, or any other transform capable of inverting effects of the detected radio signals 150, 152, 154 such as effects of the detected radio signals 150, 152, 154 imparted by physics or other processes acting on the radio signal or other processes acting on information in the radio transmitters. The signal transformer 134, via use of the transforms, functions to manipulate the detected radio signals 150, 152, 154 into a canonical form for analysis or processing by a learned model such as a classification neural network, a regression neural network, or the like. The signal transformer's manipulation of the detected radio signals 150, 152, 154 reduces the burden on the learned model 136 by eliminating the need for the learned model to perform complicated calculations to develop canonical forms for each of the detected radio signals 150, 152, 154. This results in significant performance increases by the radio receiver, such as a reduction in the amount of processing power used to make inferences based on the detected radio signals 150, 152, 154. For example, by imparting the appropriate parametric transform operations which invert physical phenomena accurately, the target manifold mapping input to estimates and transform output to learned model output than simply attempting to learn the manifold which maps the input to the learned model output directly. By reducing this complexity, less training data is needed, the model will generalize better, and size, weight and power requirements are reduced for both training and deployment.

The output of the signal transformer 134 is provided to the learned model 136. The learned model 136 may include a regression neural network, a classification neural network, or another other type of learned model. The learned model 136 may be trained to provide an output 138 that represents a particular type of information that can be inferred based on the canonicalized input that the learning model 134 receives from the signal transformer 134. In one example, the learning model 136 may be trained to generate output data 138 that indicates a number of wireless devices 120, 122, 124 that are emitting radio signals 150, 152, 154 within a predetermined geographical region. In some implementations, the geographical region may include a region associated with a building such as building 101. One example of a canonicalized form might be that of a fully synchronized communications signal, where the constellation is aligned to an ideal set of constellation points such as a grid, and timing is aligned to discrete sampling times for each symbol (e.g. timing, frequency, and phase recovery).

However, the learned model 136 need not be so limited. For example, the learned model 136 can also be trained to generate different types of output data 138. In some implementations, for example, the learned model can be trained to generate output data 138 such as a one-hot vector (or other classification label target such as a hierarchical label) that indicates whether the detected radio signals 150, 152, 154 include a particular type of signal or a zero vector if the detected radio signals 150, 152, 154 do not include the particular type of radio signal.

Yet other types of output data 138 can also be generated that are not limited to the examples set forth herein. For example, in some implementations, the radio machine learning system 130 with transformer 134 may be configured to share output data 138 by the learned model 136 with other devices to help improve their respective networks. For example, the receiver 107 may provide output 138 generated by the learned model 136 to another device that is configured to use the output 138 to adjust one or more communications systems associated with the other device. The data provided to the other device may also include, for example, one or more characteristics of the radio signal or its corresponding channel state information include estimates of timing information, center frequency, bandwidth, phase, frequency and rate of arrival, direction of arrival, channel delay response, offset, or bandwidth of the particular radio signal. These measurements may be produced in a number of ways including the output of the learned network, or as estimated parameters to the transformer network where the learned network is trained for a different end objective.

Yet other applications may include providing the output data 138 to an application that can analyze the output data 138 and infer, based on the analysis, additional information about one or more radio signal emitters. As discussed above, one example of this analysis of output data 138 and inference may include determining a number of emitters. In other implementations, other attributes about radio signal emitters may be determined, based on the output data 138, such as a location of an emitter, movement of an emitter, behavior of an emitter, or pattern of life of an emitter, modulation and encoding methods used in the transmitter, types of information carried, effects occurring in the transmitter or channel or the like.

The radio machine learning system 130 with transformer 134 also provides other advantages over legacy systems. For example, the radio machine learning system 130 with signal transformer 134 is faster and cheaper to design, optimize, deploy, and operate than alternatives because the radio signal parameter estimator 132 need not be trained in a supervised fashion (although they may be trained separately in this way alternatively), or explicitly programmed with a manually derived estimation expression to infer a particular set of signal parameters for each type or types of radio signals that may be provided as an input to the radio signal parameter estimator 132. Instead, the radio signal parameter estimator 132 is trained jointly using a loss that is determined based on the difference between the output of the learning model 136 for a particular set of radio signals input to the radio signal parameter estimator 132 and for the loss associated with the end-to-end objective of the input data and the learned model's targets utilizing the parametric transformers and estimator model.

Figure 2A:
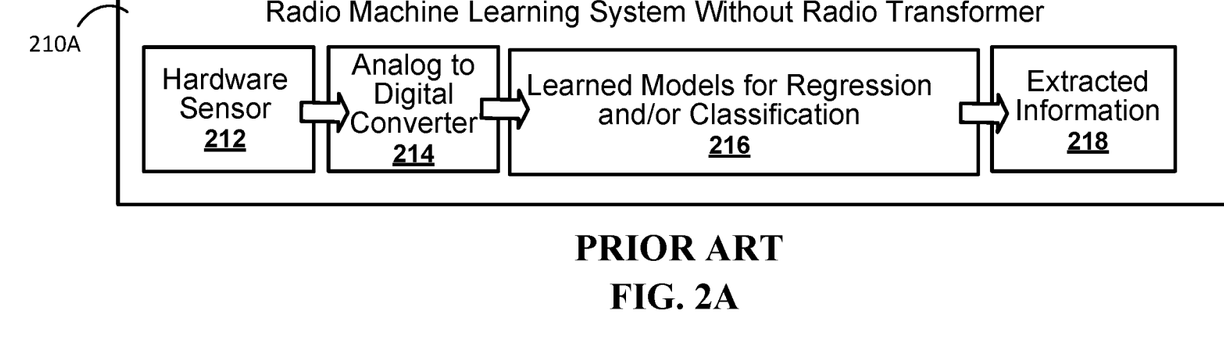
FIG. 2A is a block diagram of an example of a prior art radio machine learning system without a radio transformer.

FIG. 2A is a block diagram of an example of a prior art radio machine learning system 210A without a radio transformer. The radio machine learning system 210A includes a hardware sensor 212, an analog-to-digital converter 214, a learned model 216 for regression, classification, or both, and extracted information 218.

With reference to FIG. 2A, a hardware sensor 212 is used to detect one or more analog radio signals. The hardware sensor 212 may include an antenna with amplifiers, filters, oscillators, mixers, or a combination thereof.

In a radio machine learning system 210A without a radio signal transformer the digital version of the radio signal is directly provided into a learned model 216. This model directly produces extracted information 218 which describes the incoming signal based on the digital version of the radio signal. Such a system requires the learned model 216 to perform complex calculations in order determine how to map the input into a canonical form of the digital version of the radio signal. The extracted information 218 may take the form of information bits or code-words in the case of a learned communications systems decoder (such as in U.S. Application No. 62/500,621), it may take the form of label information about the signal in the case of a sensing system (such as in U.S. Application No. 62/489,055), or the like.

Figure 2B:
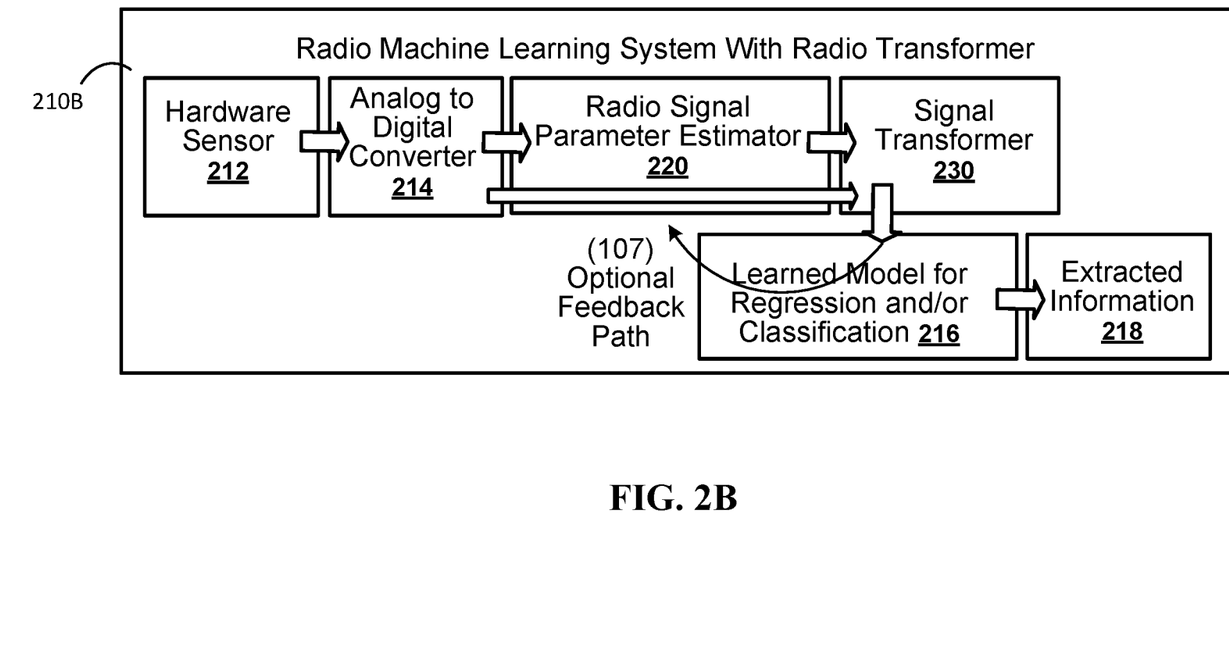
FIG. 2B is a block diagram of an example of a radio machine learning system with a radio transformer.

FIG. 2B is a block diagram of an example of a radio machine learning system 210B with a radio transformer 230.

In contrast to the radio machine learning system 210A of FIG. 2A, the FIG. 2B provides an example of a radio machine learning system 210B with a radio signal transformer 230 in accordance with the present disclosure.

The radio machine learning system 210B similarly is configured to detect one or more analog radio signals using hardware sensor 212. The hardware sensor 212 may include, for example, an antenna with amplifiers, filters, oscillators, mixers, or a combination thereof. However, instead of directly providing the digital version of the one or more radio signals to the learned model 216, the radio machine learning system 210B first provides the digital version of the one or more radio signals to a radio signal parameter estimation unit 220.

The radio signal parameter estimator 220 may include a neural network that is trained to estimate parameters of a digital version of the one or more radio signals received by the radio signal parameter estimator 220. The parameters of the one or more received radio signals may include any estimable characteristic of a radio signal such as timing information, frequency, center frequency, bandwidth, phase, rate of arrival, direction of arrival, offset, or the like. Alternatively, or in addition, parameters of the received radio signals may include any estimable characteristic of corresponding channel state information associated with the radio signal such as the channel delay response. The output of the radio signal parameter estimator 220 is a set of estimated radio signal parameters representing or describing the one or more radio signals received by the radio signal parameter estimator 220. In some implementations, the first neural network may generate a first output data parameterizing the set of transformers to extract one or more isolated radio signals using one or more operations that include sub-band tuning, mixing with an oscillator, and/or filtering.

The signal transformer 230 is configured to receive the output of the radio signal parameter estimator 220 and the digital version of the one or more radio signals that were provided as an input to the radio signal parameter estimator 220. The signal transformer 230 is configured to apply one or more transforms from a set of transforms to the digital version of the one or more radio signals received by the signal transformer 230 as an input to the signal transformer 230. The set of one or more transforms may include, for example, an affine transform, an oscillator and mixer, a convolution with a parametric set of filter taps, sub-band tuning, spatial combining, carrier and clock correction, or any other transform capable of inverting effects of the digital version of the radio signals imparted by physics or other processes acting on the radio signal.

The signal transformer 230, via the application of one or more transforms based on the received parameters from the radio signal parameter estimator, functions to manipulate the received digital version of the one or more radio signals into a canonical form for analysis by a learned model 216 such as a classification neural network, a regression neural network, or the like. The signal transformer's 230 manipulation of the digital version of the one or more radio signals reduces the burden on the learned model 216 by eliminating the need for the learned model to perform complicated calculations to develop canonical forms for each digital version of the one or more radio signals received as an input to the signal transformer 230.

Accordingly, the combined functionality of the radio signal parameter estimator 220 and the signal transformer 230 function to synchronize the radio signal into a set of canonicalized encoded information representing the radio signal such as a time, frequency, and phase aligned stream of modulated radio constellation points. The canonicalized form of the analog signal results in an elimination of more than a threshold amount of uncertainty surrounding one or more of the signal or channel characteristics such as frequency offset, the time offset, or other the channel effects. This canonicalized form results in multiple performance increases by the radio receiver such as a reduction in processing power used to make inferences based on the digital version of the one or more radio signals received as an input to the signal transformer.

The output of the signal transformer 220 can be provided to the learned model 216. In addition, for some implementations, the output of the signal transformer 230 may optionally be used to update parameters of the radio signal parameter estimator 220. The radio signal parameter estimator 220 may include a regression neural network, a classification neural network, or another other type of learned model. The radio signal parameter estimator 220 may be trained to generate extracted information 218 as an output that represents a particular type of information can be inferred based on the output data of the signal transformer 230 that is provided to the learning model 216 as an input. In one example, the learning model 216 may be trained to generate output data 138 that indicates a number of wireless devices that are producing radio signals within a predetermined geographical region.

However, other types of extracted data may be generated by the learning model 216 as an output. For example, the extracted information generated by the learned model 216 may include one or more of data describing signal labels, modulation type, protocol, wireless standards, equipment type, symbol values, data bits, data code-words, or any other classification of data associated with a radio signal.

Figure 3:
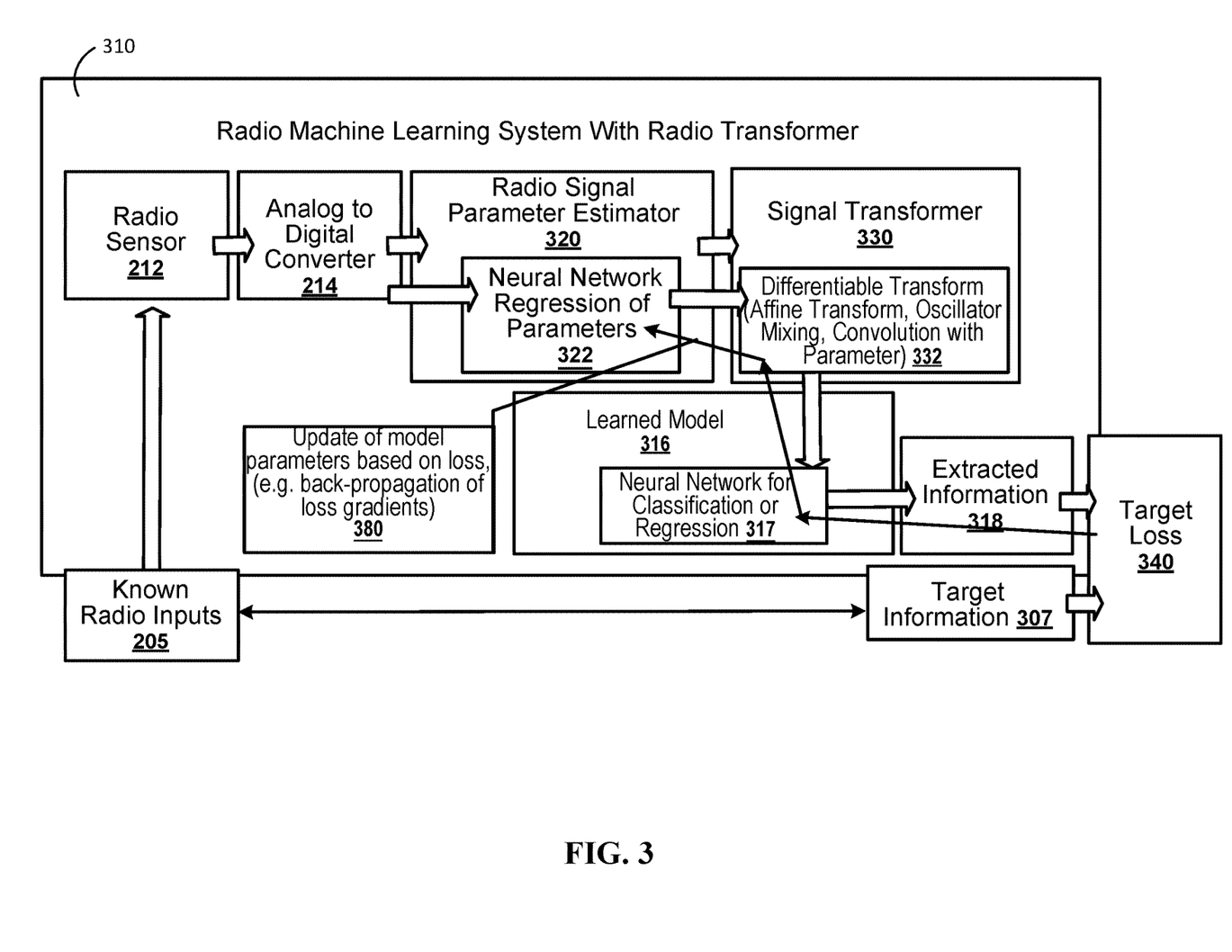
FIG. 3 is a block diagram of an example of a radio machine learning system with a radio transformer for training a neural network based radio signal parameter estimator and a learning model.

FIG. 3 is a block diagram of an example of a radio machine learning system 310 with a radio transformer 330 for training a neural network based radio signal parameter estimator 320 and a learning model 316.

In the example of FIG. 3, the radio machine learning system 310 may employ a radio signal parameter estimator 320 and a learned model 316 that each include one or more neural networks. Each neural network may include, for example, one or more collections of sequential multiplies, additions, and optional non-linearities that have each been respectively trained to realize the functionality of the radio signal parameter estimator 320 and the learned model 316. The learned model 316 may include a learned model for regression, classification, or both. In some implementations, a neural network is used for parameter regression 322 and a neural network 317 is used for classification, regression, or both, of output information.

The radio signal parameter estimator 320 and the learned model 316 are bridged by the signal transformer 330. The signal transformer 330 is configured to receive, as inputs, the output of the radio signal parameter estimator and the digital version of the one or more radio signals that were input into the signal parameter estimator 320. The signal transformer 330 is configured to generate, as an output, a transformation of or set of estimates describing aspects of the digital version of the one or more radio signals that the signal transformer 330 received as an input. The signal transformer 330 generates transformation of the digital version of the one or more radio signals by applying one or more transforms to the digital version of the one or more radio signals that are received by the signal transformer 330 as an input. The set of one or more transforms may include, for example, an affine transform, an oscillator and mixer, a convolution with a parametric set of filter taps, or any other transform capable of inverting effects of the digital versions of the one or more received signals such as effects of the received one or more signals imparted by physics or other processes acting on the one or more received signals. In some implementations, only a single transform may be applied to the received signals. In other implementations, multiple transforms of the set of potential transforms identified above may be applied in combination. In some instances non-parametric transforms such as Fourier transforms may additionally be applied to the data before or after the application of the parametric transformer and/or estimator model. In some instances, the estimates from the first model comprising a description of the channel state information (CSI), and the canonicalized form of the signal or a transform or representation thereof, may comprise a compact representation of the signal which can be used for transmission, analysis, reception, or otherwise. In this case, it can be very advantageous to separate the CSI from the content in this way so as to allow for better analysis, removal of random information, and improved compression in some cases by helping removing or separately maintaining unnecessary random variables from the CSI.

In some implementations, the signal transformer may be implemented using a neural network that is configured to perform the transforms. In such implementations, a third neural network 332 is configured so that these transformations are performed within the third neural network 330 that bridges the first neural network 322 used to implement the radio signal parameter estimator 320 and a second neural network 317 that is configured to implement the learned model 316 using classification, regression, or both. The third neural network 332 bridges the first neural network 322 and the second neural network 317 by generating output based on the inputs to the third neural network that include digital version of the one or more received radio signals produced by the analog-to-digital converter 214 and the output of the first neural network 322. The output of the first neural network 322 includes estimated radio signal parameters for the digital version of the one or more radio signals. In some instances the weights or network parameters of this signal transformer neural network may be frozen or used unchanged from training on a prior task during the training of the estimator model and the learned model, or they may be jointly learned, optionally leveraging prior known weights to assist in optimization.

The estimated radio signal parameters may include any measurable or estimable characteristic of a radio signal such as timing information, frequency, center frequency, bandwidth, phase, rate of arrival, direction of arrival, offset, or the like. Alternatively, or in addition, the estimated radio signal parameters may include any measurable or estimable characteristic of corresponding channel state information associated with the radio signal such as the channel impulse response or power-delay response. The digital version of the one or more radio signals are transformed using these estimated parameters by transforms for each parameter to produce a transformed signal which is fed to the learned model 316 to produce useful extracted information (304). The parametric transformations are crafted in order to allow for differentiation and backwards propagation of error gradients from outputs to weights and inputs.

Accordingly, the combined functionality of the neural network 322 of the radio signal parameter estimator 320 and neural network 332 of the signal transformer 330 functions to synchronize the radio signal into a set of canonicalized encoded information representing or describing aspects of the radio signal such as a time and frequency aligned stream of modulated radio constellation points. The canonicalized form of the analog signal results in an elimination of more than a threshold amount of uncertainty surrounding one or more of the signal or channel characteristics such as frequency offset, the time offset, or other the channel effects. This canonicalized form results in multiple performance increases by the radio receiver such as a reduction in processing power used to make inferences based on the digital version of the one or more radio signals received as an input to the signal transformer.

The transformed signal that is generated by the signal transformer as an output is provided to the learned model 316. In some implementations, the learned model 316 may include a neural network 317 that is trained for classification or regression and configured to take the transformed signal as an input. In such implementations, the transformed signal that is received as an input to the neural network 317 may be mapped to output information 318 through the neural network 317. A target loss 340 may be computed using a variety of loss determination methods such as mean squared error, cross-entropy or other distance metric and be formed based on the output information 318 and the target output information 307 for a known analog radio input 205 upon which the digital version of the one or more radio signals was generated by the analog-to-digital converter 214.

The target loss may be used to compute gradients which are propagated backwards through the neural network 317 of the learned model, the neural network 332 of the signal transformer, and the neural network 322 of the radio signal parameter estimator, shown via the arrows in FIG. 3 extending from the target loss 340 to the neural network 317 for the learned model, the neural network 332 for the signal transformer, and the neural network 322 for the radio signal parameter estimator to obtain parameter updates and dynamically optimize each of these models to minimize the target loss 340. In some implementations, the analog radio input 205 may be generated through the use of one or more learned neural networks or channel simulations prior and the target loss function may additionally adjust the parameters of the one or more prior neural networks or simulations of one or more of the prior neural networks in addition to the backwards propagation of the target loss through the neural network 317 of the learned model, the neural network 332 of the signal transformer, and the neural network 322 of the radio signal parameter estimator, shown via the arrows in FIG. 3. The back-propagation of the computed variants thus results in improving the performance of the entire system, improving signal labeling accuracy and/or improving bit error rate or symbol error rate within a learned communications system receiver.

Figure 4:
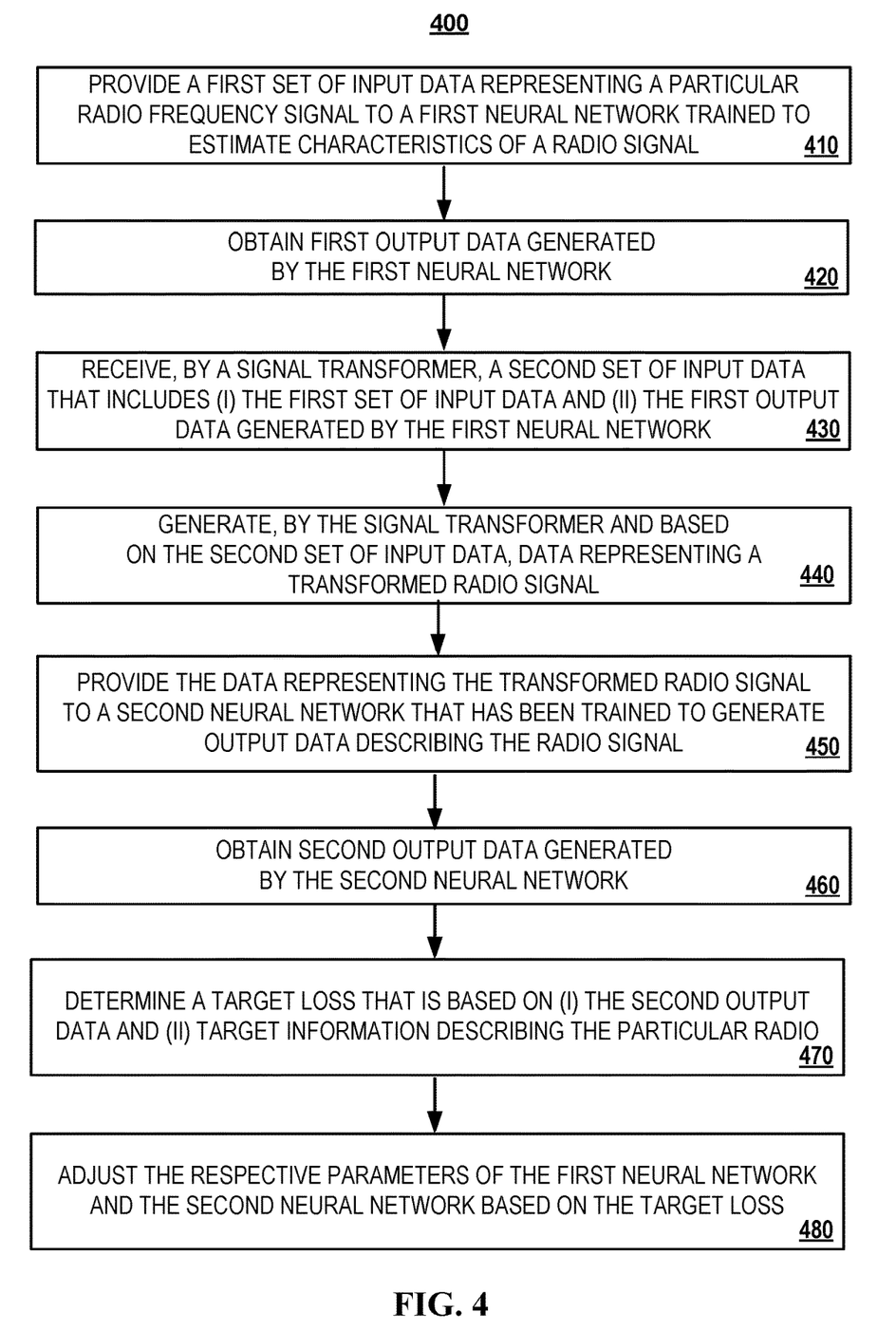
FIG. 4 is a flowchart of an example of a process for training a radio machine learning system with radio transformer.

FIG. 4 is a flowchart of an example of a process 400 for training a radio machine learning system with radio transformer. In general, the process 400 may include providing a first set of input data representing a particular radio signal to a first neural network trained to estimate characteristics of one or more radio signals (410), obtaining first output data generated by the first neural network (420), receiving, by a signal transformer, a second set of input data that includes (i) the first set of input data and (ii) the first output data generated by the first neural network (430), generating, by the signal transformer and based on the second set of input data, data representing a transformed radio signal (440), providing the data representing the transformed radio signal to a second neural network that has been trained to generate output data describing the radio signal (450), obtaining second output data generated by the second neural network (460), determining a target loss that is based on (i) the second output data and (ii) target information describing the particular radio signal (470), and adjusting the respective parameters of the first neural network and the second neural network based on the target loss (480). The process 400 is described below as being performed by a receiver on which computer program code describing the functionality of the aforementioned neural networks is stored and executed to realize the functionality described by process 400.

In more detail, a receiver may begin executing process 400 for training a radio machine learning system with radio transformer by providing 410 a first set of input data representing a particular radio signal to a first neural network trained to estimate characteristics of a radio signal (410). The first set of input data representing the particular radio signal may include a digital representation of an analog signal detected by the antenna of a receiver. The digital representation of the analog signal may be generated by sampling one or more particular analog radio signals into a basis function such I/Q representation, OFDM subcarriers, or the like. In some implementations, the analog radio signal upon which the first set of input data is based may include a plurality of radio signal communications, radar, or other signals that are received.

The first neural network may include a neural network that has been trained to estimate characteristics of a digital representation of an analog radio signal. Alternatively, or in addition, the first neural network may also be trained to estimate characteristics of corresponding channel state information associated with the radio signal such as the channel delay response. In some instances, this estimation network may be trained independently to map input data to a set of known measurements describing various aspects of the signal such as frequency, phase, timing, delay profile, or rate information.

The receiver can obtain 420 first output data generated by the first neural network. The first output data may include data representing any measurable or estimable characteristic of a radio signal such as timing information, frequency, center frequency, bandwidth, phase, rate of arrival, direction of arrival, offset, or the like. Alternatively, or in addition, the first output data may also include any measurable or estimable characteristic of corresponding channel state information associated with the radio signal such as the channel delay response.

The receiver can receive 430, using a signal transformer, a second set of input data that includes (i) the first set of input data and (ii) the first output data generated by the first neural network. The first set of input data may include data representing the particular radio signal may include a digital representation of an analog signal detected by the antenna of a receiver. The first output data generated by the first neural network may include data representing any measurable or estimable characteristic of a radio signal such as timing information, frequency, center frequency, bandwidth, phase, rate of arrival, direction of arrival, offset, or the like. Alternatively, or in addition, the first output data may also include any measurable or estimable characteristic of corresponding channel state information associated with the radio signal such as the channel delay response.

The receiver can generate 440, using the signal transformer and based on the second set of input data, data representing a transformed radio signal. The signal transformer can generate the transformed radio signal by applying one or more transforms of a set of multiple transforms. The set of multiple transforms may include, for example, an affine transform, an oscillator and mixer, a convolution with a parametric set of filter taps, or any other transform capable of inverting effects of the one or more radio signals such as effects of the one or more radio signals imparted by physics or other processes acting on the one or more radio signals.

The receiver can provide 450 the data representing the transformed radio signal to a second neural network that has been trained to generate output data describing the radio signal. The second neural network may include a classification neural network or a regression neural network.

The receiver can obtain 460 second output data generated by the second neural network (460). The second output data may include one or more of signal labels, modulation type, protocol, symbol values, data bits, data code-words, or the like.

The receiver can determine 470 a target loss that is based on (i) the second output data and (ii) target information describing the particular radio signal. The target loss may be determined using methods such as mean squared error, cross-entropy or other distance metric. This target loss may be used to compute gradients for backwards propagation through the neural networks that the receivers uses to perform the process 400. The receiver can adjust 480 the respective parameters of the first neural network and the second neural network based on the target loss (480).

Figure 5:
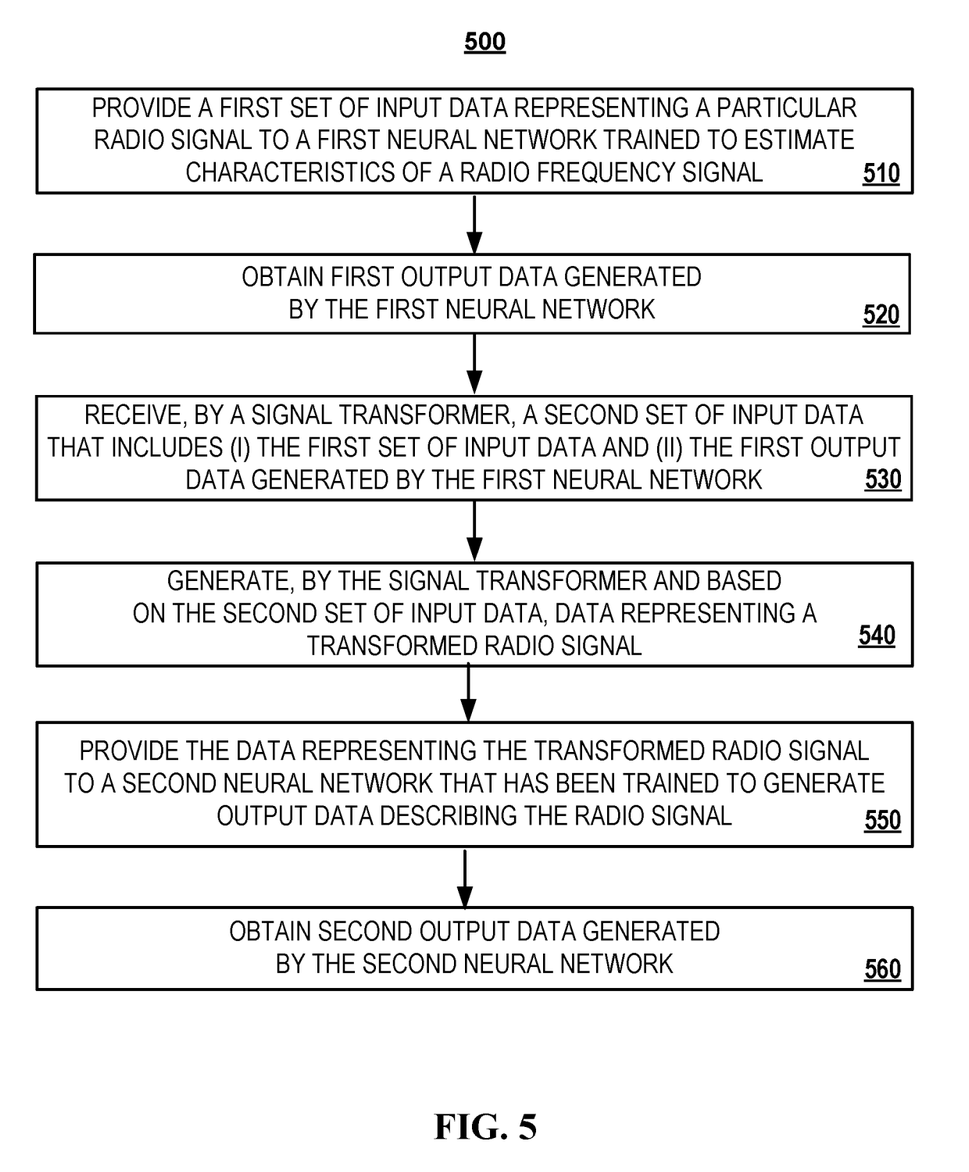
FIG. 5 is a flowchart of an example of a run-time process for using a radio machine learning system with a radio transformer extract information from a plurality of radio signals.

FIG. 5 is a flowchart of an example of a run-time process 500 for using a radio machine learning system with a radio transformer extract information from a plurality of radio signals. The process 500 is similar to the process 400 without determining the loss and adjusting the parameters of each respective neural network using the adjusted loss.

Accordingly the process 500 generally includes providing a first set of input data representing a particular radio signal to a first neural network trained to estimate characteristics of one or more radio signals (510), obtaining first output data generated by the first neural network (520), receiving, by a signal transformer, a second set of input data that includes (i) the first set of input data and (ii) the first output data generated by the first neural network (530), generating, by the signal transformer and based on the second set of input data, data representing a transformed radio signal (540), providing the data representing the transformed radio signal to a second neural network that has been trained to generate output data describing the radio signal (550), and obtaining second output data generated by the second neural network (560).

A server may also configured to deploy the radio machine learning system with a radio transformer described herein. In such embodiments, the server may be configured to provide, across one or more networks, a radio machine learning system such as the radio machine learning system such as radio machine learning system 210B or radio machine learning system 310 for storage and executed on a device such as a receiver. In such instances, the server may be configured to deploy a radio machine learning system that is configured to perform each and every operation of processes 400 and 500 described above. Similarly, the server may also be configured to deploy, across one or more networks such as the Internet, a radio machine learning system with radio transformer that includes any of the features described with reference to FIGS. 1, 2B, 3, 4, and 5 described in this specification.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "data processing apparatus" and "processor" encompass all kinds of apparatus, devices, and machines for processing data, including by way of example a programmable processor, a computer, or multiple processors or computers. The apparatus or processor can include special purpose logic circuitry, e.g., an FPGA (field programmable gate array) or an ASIC (application specific integrated circuit). The apparatus or processor can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display), LED (light-emitting diode), or OLED (organic light-emitting diode) monitor, for displaying information to the user and a keyboard and a pointing device, e.g., a mouse, a trackball, or a touchscreen, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The invention claimed is:

1. A system to process one or more radio signals, the system comprising:
one or more processors; and
one or more computer readable media storing computer code that, when executed by the one or more processors, is configured to perform a plurality of operations, the operations comprising:
providing, to a signal transformer, first data that includes channel state information describing a characteristic of a channel used for communicating a radio signal;
generating, by the signal transformer and based on the first data including the channel state information describing the characteristic of the channel used for communicating the radio signal, second data representing a transformed radio signal, wherein generating the second data representing the transformed radio signal includes applying one or more transforms to the first data representing the radio signal;
providing the second data representing the transformed radio signal to a machine learning model that is configured to generate output data describing the radio signal based on processing the second data representing the transformed radio signal; and
obtaining output data generated by the machine learning model based on processing the second data representing the transformed radio signal, wherein the output data is configured to enable a radio signal receiver to infer additional information corresponding to one or more emitters of the radio signal based on processing the output data.

2. The system of claim 1, wherein the channel state information comprises one or more values representing a channel delay response.

3. The system of claim 1, wherein the output data generated by the machine learning model based on processing the second data representing the transformed radio signal comprises one or more of signal labels, modulation type, protocol, symbol values, data bits, or data code-words.

4. The system of claim 1, wherein the operations comprise:
generating a portion of the first data, that includes channel state information associated with the radio signal, using one or more non-parametric transforms.

5. The system of claim 1, wherein generating the second data representing the transformed radio signal comprises:
generating the second data representing the transformed radio signal using one or more parametric transforms.

6. The system of claim 1, wherein generating the second data representing the transformed radio signal comprises:
generating the second data representing the transformed radio signal using one or more parametric transforms prior to using one or more non-parametric transforms.

7. The system of claim 1, wherein the operations comprise:
obtaining a portion of the first data, that includes channel state information associated with the radio signal, generated by a second machine learning model different than the machine learning model that generates the output data.

8. A method for processing one or more radio signals, the method comprising:
providing, to a signal transformer, first data that includes channel state information associated with describing a characteristic of a channel used for communicating a radio signal;
generating, by the signal transformer and based on the first data including the channel state information describing the characteristic of the channel used for communicating the radio signal, second data representing a transformed radio signal, wherein generating the second data representing the transformed radio signal includes applying one or more transforms to the first data representing the radio signal;

providing the second data representing the transformed radio signal to a machine learning model that is configured to generate output data describing the radio signal based on processing the second data representing the transformed radio signal; and obtaining output data generated by the machine learning model based on processing the second data representing the transformed radio signal, wherein the output data is configured to enable a radio signal receiver to infer additional information corresponding to one or more emitters of the radio signal based on processing the output data.

9. The method of claim 8, wherein the channel state information comprises one or more values representing a channel delay response.

10. The method of claim 8, wherein the output data generated by the machine learning model based on processing the second data representing the transformed radio signal comprises one or more of signal labels, modulation type, protocol, symbol values, data bits, or data code-words.

11. The method of claim 8, comprising:
generating a portion of the first data, that includes channel state information associated with the radio signal, using one or more non-parametric transforms.

12. The method of claim 8, wherein generating the second data representing the transformed radio signal comprises:
generating the second data representing the transformed radio signal using one or more parametric transforms.

13. The method of claim 8, wherein generating the second data representing the transformed radio signal comprises:
generating the second data representing the transformed radio signal using one or more parametric transforms prior to using one or more non-parametric transforms.

14. The method of claim 8, comprising:
obtaining a portion of the first data, that includes channel state information associated with the radio signal, generated by a second machine learning model different than the machine learning model that generates the output data.

15. A non-transitory computer-readable medium storing one or more instructions executable by a computer system to perform operations comprising:
providing, to a signal transformer, first data that includes channel state information describing a characteristic of a channel used for communicating a radio signal;

generating, by the signal transformer and based on the first data including the channel state information describing the characteristic of the channel used for communicating the radio signal, second data representing a transformed radio signal, wherein generating the second data representing the transformed radio signal includes applying one or more transforms to the first data representing the radio signal;

providing the second data representing the transformed radio signal to a machine learning model that is configured to generate output data describing the radio signal based on processing the second data representing the transformed radio signal; and obtaining output data generated by the machine learning model based on processing the second data representing the transformed radio signal, wherein the output data is configured to enable a radio signal receiver to infer additional information corresponding to one or more emitters of the radio signal based on processing the output data.

16. The medium of claim 15, wherein the channel state information comprises one or more values representing a channel delay response.

17. The medium of claim 15, wherein the output data generated by the machine learning model based on processing the second data representing the transformed radio signal comprises one or more of signal labels, modulation type, protocol, symbol values, data bits, or data code-words.

18. The medium of claim 15, wherein the operations comprise:
generating a portion of the first data, that includes channel state information associated with the radio signal, using one or more non-parametric transforms.

19. The medium of claim 15, wherein generating the second data representing the transformed radio signal comprises:
generating the second data representing the transformed radio signal using one or more parametric transforms.

20. The medium of claim 15, wherein generating the second data representing the transformed radio signal comprises:
generating the second data representing the transformed radio signal using one or more parametric transforms prior to using one or more non-parametric transforms.

* * * * *

UNITED STATES PATENT AND TRADEMARK OFFICE
CERTIFICATE OF CORRECTION

| | |
|---|---|
| PATENT NO. | : 12,061,982 B2 |
| APPLICATION NO. | : 17/962007 |
| DATED | : August 13, 2024 |
| INVENTOR(S) | : Timothy James O'Shea |

It is certified that error appears in the above-identified patent and that said Letters Patent is hereby corrected as shown below:

In the Claims

Column 16, Line 57, In Claim 8, after "information" delete "associated with".

Signed and Sealed this
Twenty-second Day of October, 2024

Katherine Kelly Vidal
*Director of the United States Patent and Trademark Office*